US011956835B2

(12) United States Patent
Abedini et al.

(10) Patent No.: US 11,956,835 B2
(45) Date of Patent: Apr. 9, 2024

(54) BEAMFORMING CONFIGURATIONS FOR RANDOM ACCESS CHANNEL CONFIGURATION

(71) Applicant: QUALCOMM Incorporated, San Diego, CA (US)

(72) Inventors: Navid Abedini, Basking Ridge, NJ (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/450,023

(22) Filed: Oct. 5, 2021

(65) Prior Publication Data
US 2023/0105291 A1 Apr. 6, 2023

(51) Int. Cl.
H04W 74/08 (2009.01)
H04W 16/28 (2009.01)
H04W 72/044 (2023.01)
H04W 74/0833 (2024.01)

(52) U.S. Cl.
CPC ....... H04W 74/0841 (2013.01); H04W 16/28 (2013.01); H04W 72/046 (2013.01); H04W 74/0891 (2013.01)

(58) Field of Classification Search
CPC ............. H04W 74/0841; H04W 16/28; H04W 72/046; H04W 74/0891
See application file for complete search history.

(56) References Cited

U.S. PATENT DOCUMENTS

| 10,070,463 | B2* | 9/2018 | Wong ................. H04W 74/0833 |
| 11,528,657 | B1* | 12/2022 | Mangalvedhe ....... H04W 16/28 |
| 2018/0324850 | A1* | 11/2018 | Amuru ................... H04B 7/088 |
| 2019/0053120 | A1* | 2/2019 | Park .................. H04W 74/0833 |
| 2019/0058538 | A1* | 2/2019 | Sun ....................... H04B 7/0413 |
| 2019/0116613 | A1* | 4/2019 | Abedini ................ H04W 74/02 |
| 2019/0158337 | A1* | 5/2019 | Yoon ................. H04W 74/0841 |
| 2020/0137806 | A1* | 4/2020 | Islam .................. H04L 27/2607 |
| 2020/0252891 | A1* | 8/2020 | Chendamarai Kannan ................ H04W 74/0808 |

(Continued)

OTHER PUBLICATIONS

Y. Liu et al., "True Time Delay Millimeter Wave Beam Steering with Integrated Optical Beamforming Network," 2019 Conference on Lasers and Electro-Optics (CLEO), May 2019, 2 pages.

Primary Examiner — Ivan O Latorre
(74) Attorney, Agent, or Firm — Harrity & Harrity LLP/Qualcomm Incorporated

(57) ABSTRACT

Various aspects of the present disclosure generally relate to wireless communication. In some aspects, a base station may generate a signal for a set of synchronization signal blocks (SSBs) for an SSB burst set, wherein the set of SSBs are associated with a set of analog beamforming configurations associated with a set of spatial directions. The base station may transmit the signal for the set of SSBs using the set of analog beamforming configurations over the set of spatial directions. The base station may receive one or more random access channel (RACH) communications corresponding to one or more SSBs of the set of SSBs in accordance with one or more frequency domain beam sweeping configurations corresponding to one or more analog beamforming configurations of the set of analog beamforming configurations. Numerous other aspects are described.

30 Claims, 10 Drawing Sheets

(56) References Cited

U.S. PATENT DOCUMENTS

| | | | |
|---|---|---|---|
| 2020/0344810 A1* | 10/2020 | Xiong | H04W 74/0833 |
| 2021/0058971 A1* | 2/2021 | MolavianJazi | H04L 5/0044 |
| 2021/0136828 A1* | 5/2021 | Hakola | H04W 74/0833 |
| 2021/0243812 A1* | 8/2021 | Agiwal | H04W 74/0833 |
| 2022/0046724 A1* | 2/2022 | Maso | H04W 74/0833 |
| 2022/0210841 A1* | 6/2022 | Lin | H04W 56/001 |
| 2022/0346014 A1* | 10/2022 | Fei | H04W 68/005 |
| 2022/0346104 A1* | 10/2022 | Yi | H04W 72/56 |
| 2023/0036683 A1* | 2/2023 | Karri | H04B 7/0626 |
| 2023/0054111 A1* | 2/2023 | Rudolf | H04W 74/006 |

* cited by examiner

BEAMFORMING CONFIGURATIONS FOR RANDOM ACCESS CHANNEL CONFIGURATION

FIELD OF THE DISCLOSURE

Aspects of the present disclosure generally relate to wireless communication and to techniques and apparatuses for beamforming configurations for random access channel (RACH) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a base station for wireless communication includes a memory; a transceiver; and one or more processors, coupled to the memory and the transceiver, configured to: generate a signal for a set of synchronization signal blocks (SSBs) for an SSB burst set, wherein the set of SSBs are associated with a set of analog beamforming configurations associated with a set of spatial directions; transmit, using the transceiver, the signal for the set of SSBs using the set of analog beamforming configurations over the set of spatial directions; and receive, using the transceiver, one or more random access channel (RACH) communications corresponding to one or more SSBs of the set of SSBs in accordance with one or more frequency domain beam sweeping configurations corresponding to one or more analog beamforming configurations of the set of analog beamforming configurations.

In some aspects, a method of wireless communication performed by a base station includes generating a signal for a set of SSBs for an SSB burst set, wherein the set of SSBs are associated with a set of analog beamforming configurations associated with a set of spatial directions; transmitting the signal for the set of SSBs using the set of analog beamforming configurations over the set of spatial directions; and receiving one or more RACH communications corresponding to one or more SSBs of the set of SSBs in accordance with one or more frequency domain beam sweeping configurations corresponding to one or more analog beamforming configurations of the set of analog beamforming configurations.

In some aspects, a non-transitory computer-readable medium storing a set of instructions for wireless communication includes one or more instructions that, when executed by one or more processors of a base station, cause the base station to: generate a signal for a set of SSBs for an SSB burst set, wherein the set of SSBs are associated with a set of analog beamforming configurations associated with a set of spatial directions; transmit the signal for the set of SSBs using the set of analog beamforming configurations over the set of spatial directions; and receive one or more RACH communications corresponding to one or more SSBs of the set of SSBs in accordance with one or more frequency domain beam sweeping configurations corresponding to one or more analog beamforming configurations of the set of analog beamforming configurations.

In some aspects, an apparatus for wireless communication includes means for generating a signal for a set of SSBs for an SSB burst set, wherein the set of SSBs are associated with a set of analog beamforming configurations associated with a set of spatial directions; means for transmitting the signal for the set of SSBs using the set of analog beamforming configurations over the set of spatial directions; and means for receiving one or more RACH communications corresponding to one or more SSBs of the set of SSBs in accordance with one or more frequency domain beam sweeping configurations corresponding to one or more analog beamforming configurations of the set of analog beamforming configurations.

In some aspects, a user equipment (UE) for wireless communication includes a memory; a transceiver; and one or more processors, coupled to the memory, configured to: select, for transmission of a random access channel (RACH) communication as a response to a received synchronization signal block (SSB) associated with an analog beamforming configuration, a RACH occasion (RO) based at least in part on a measurement of the received SSB, wherein the RO is at a spatial direction disposed between consecutive spatial directions of consecutive ROs configured for one or more RACH communications; transmit, using the transceiver, the RACH communication using the RO and a frequency domain beam sweeping configuration corresponding to the analog beamforming configuration.

In some aspects, a non-transitory computer-readable medium storing a set of instructions for wireless communication includes one or more instructions that, when executed by one or more processors of a user equipment (UE), cause the UE to: select, for transmission of a random access channel (RACH) communication as a response to a received synchronization signal block (SSB) associated with an analog beamforming configuration, a RACH occasion (RO) based at least in part on a measurement of the received SSB, wherein the RO is at a spatial direction disposed between consecutive spatial directions of consecutive ROs configured for one or more RACH communications; transmit the RACH communication using the RO and a frequency domain beam sweeping configuration corresponding to the analog beamforming configuration.

In some aspects, an apparatus for wireless communication includes means for selecting, for transmission of a random access channel (RACH) communication as a response to a received synchronization signal block (SSB) associated with an analog beamforming configuration, a RACH occasion (RO) based at least in part on a measurement of the received SSB, wherein the RO is at a spatial direction disposed between consecutive spatial directions of consecutive ROs configured for one or more RACH communications; means for transmitting the RACH communication using the RO and a frequency domain beam sweeping configuration corresponding to the analog beamforming configuration.

In some aspects, a method of wireless communication performed by a user equipment (UE) includes selecting, for transmission of a random access channel (RACH) communication as a response to a received synchronization signal block (SSB) associated with an analog beamforming configuration, a RACH occasion (RO) based at least in part on a measurement of the received SSB, wherein the RO is at a spatial direction disposed between consecutive spatial directions of consecutive ROs configured for one or more RACH communications; transmitting the RACH communication using the RO and a frequency domain beam sweeping configuration corresponding to the analog beamforming configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
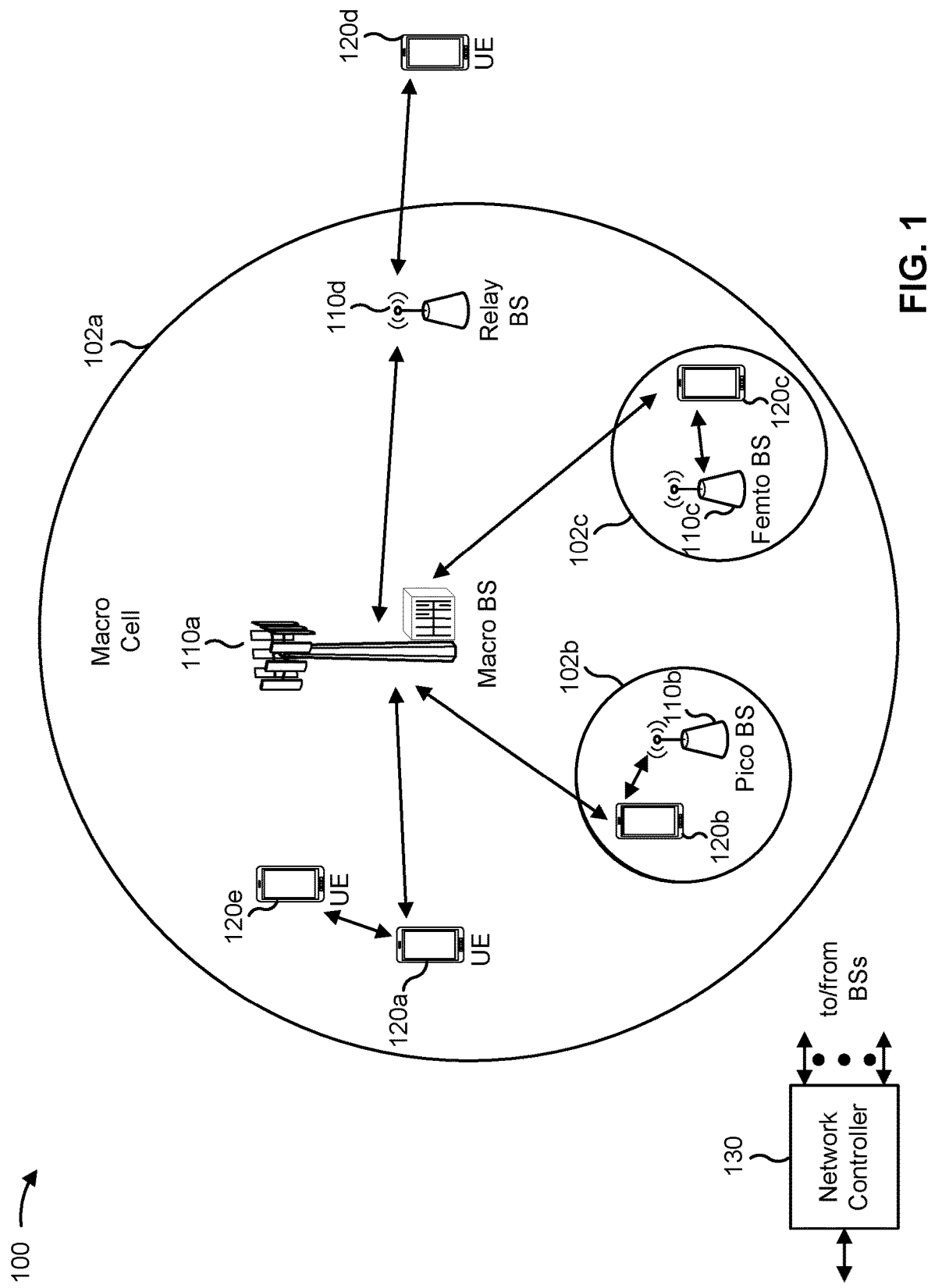
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an "NR BS", a "Node B", a "gNB", a "5G node B" ("NB"), an "access point", a "transmit receive point" ("TRP"), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the BS 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
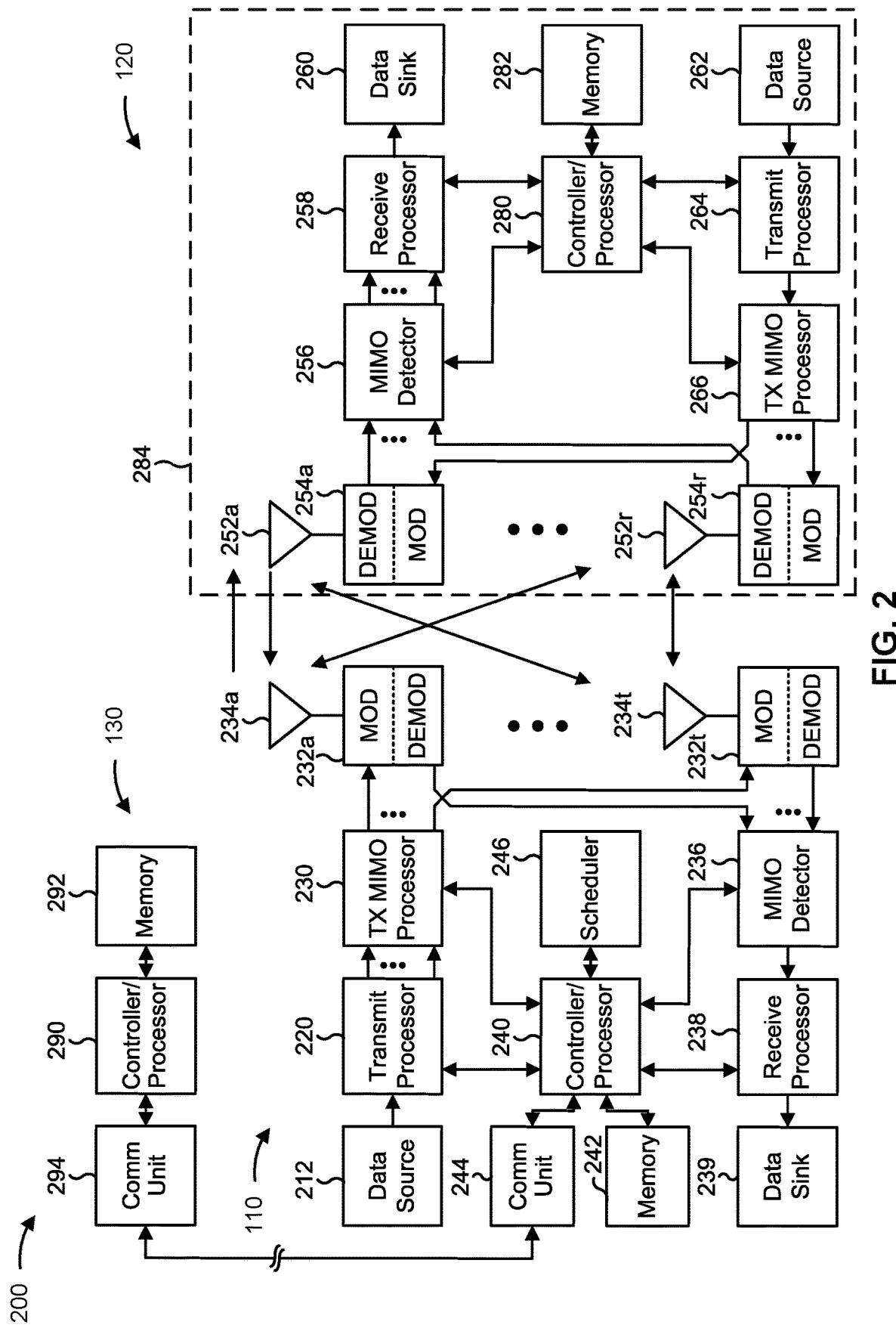
FIG. 2 is a diagram illustrating an example of a base station in communication with a UE in a wireless network, in accordance with the present disclosure.

FIG. 2 is a diagram illustrating an example 200 of a BS 110 in communication with a UE 120 in a wireless network 100, in accordance with the present disclosure. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with BS 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to BS 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. BS 110 may include a scheduler 246 to schedule UEs 120 for downlink and/or uplink communications. In some aspects, a modulator and a demodulator (e.g., MOD/DEMOD 232) of the BS 110 may be included in a modem of the BS 110. In some aspects, the BS 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of BS 110, controller/processor 280 of UE 120, and/or any other component(s) of FIG. 2 may perform one or more techniques associated with beamforming configurations for random access channel (RACH) configuration, as described in more detail elsewhere herein. For example, controller/processor 240 of BS 110, controller/processor 280 of UE 120, and/or any other component(s) of FIG. 2 may perform or direct operations of, for example, process 700 of FIG. 7, process 900 of FIG. 9, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the BS 110 and/or the UE 120, may cause the one or more processors, the UE 120, and/or the BS 110 to perform or direct operations of, for example, process 700 of FIG. 7, process 900 of FIG. 9, and/or other processes as described herein. In some aspects, executing instructions may include running the instructions, converting the instructions, compiling the instructions, and/or interpreting the instructions, among other examples.

In some aspects, the base station includes means for generating (e.g., using controller/processor 240, transmit processor 220, TX MIMO processor 230, MOD 232, antenna 234, memory 242, or the like) a signal for a set of synchronization signal blocks (SSBs) for an SSB burst set, wherein the set of SSBs are associated with a set of analog beamforming configurations associated with a set of spatial directions; means for transmitting (e.g., via a transceiver and/or using controller/processor 240, transmit processor 220, TX MIMO processor 230, MOD 232, antenna 234, memory 242, or the like) the signal for the set of SSBs using the set of analog beamforming configurations over the set of spatial directions; and/or means for receiving (e.g., via a transceiver and/or using antenna 234, DEMOD 232, MIMO detector 236, receive processor 238, controller/processor 240, memory 242, or the like) one or more RACH communications corresponding to one or more SSBs of the set of SSBs in accordance with one or more frequency domain beam sweeping configurations corresponding to one or more analog beamforming configurations of the set of analog beamforming configurations. The means for the base station to perform operations described herein may include, for example, a transceiver, one or more of transmit processor 220, TX MIMO processor 230, modulator 232, antenna 234, demodulator 232, MIMO detector 236, receive processor 238, controller/processor 240, memory 242, or scheduler 246.

In some aspects, the UE includes means for selecting (e.g., using controller/processor 280, memory 282, or the like), for transmission of a RACH communication as a response to a received SSB associated with an analog beamforming configuration, a RACH occasion (RO) based at least in part on a measurement of the received SSB, wherein the RO is at a spatial direction disposed between consecutive spatial directions of consecutive ROs configured for one or more RACH communications; means for transmitting (e.g., via a transceiver and/or using controller/processor 280, transmit processor 264, TX MIMO processor 266, MOD 254, antenna 252, memory 282, or the like) the RACH communication using the RO and a frequency domain beam sweeping configuration corresponding to the analog beamforming configuration. The means for the user equipment (UE) to perform operations described herein may include, for example, a transceiver, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
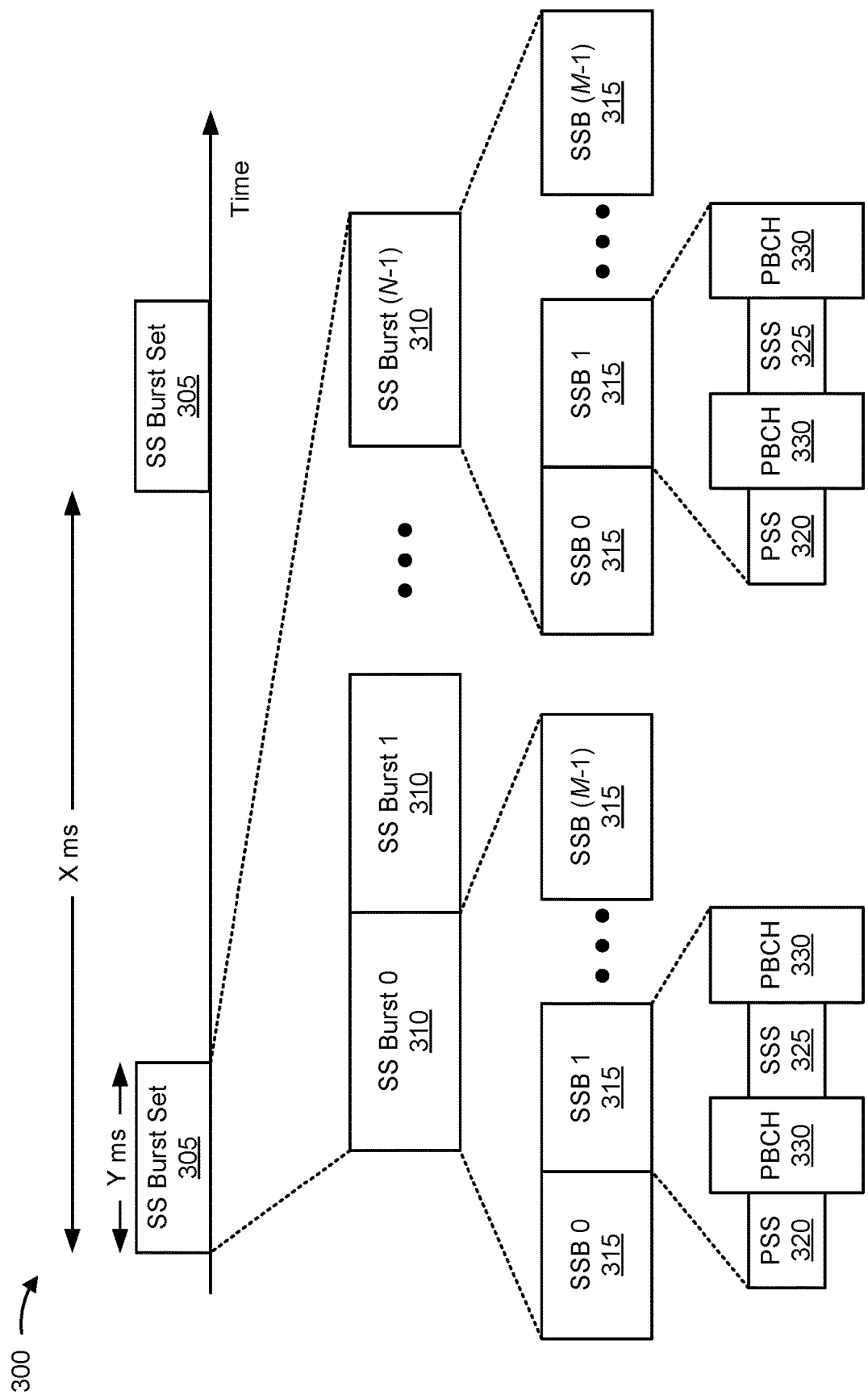
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which ma include multiple SS bursts 310, shown as SS burst 0 through SS burst N–1, where N is a maximum number of repetitions of the SS burst 310 that may be transmitted by the base station. As further shown, each SS burst 310 may include one or more SS blocks (SSBs) 315, shown as SSB 0 through SSB M–1, where M is a maximum number of SSBs 315 that can be carried by an SS burst 310. In some aspects, different SSBs 315 may be beam-formed differently (e.g., transmitted using different beams) and may be used for cell search, cell acquisition, beam management, and/or beam selection (e.g., as part of an initial network access procedure). An SS burst set 305 may be periodically transmitted by a wireless node (e.g., BS 110), such as every X milliseconds (ms), as shown in FIG. 3. In some aspects, an SS burst set 305 may have a fixed or dynamic length, shown as Y ms in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a primary synchronization signal (PSS) 320, a secondary synchronization signal (SSS) 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., orthogonal frequency division multiplexing (OFDM) symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., a BS 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., a reference signal received power (RSRP) parameter) to a BS 110. The BS 110 and the UE 120 may use the one or more indicated SSBs 315 to select one or more beams to be used for communication between the BS 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

In some aspects, a wireless node (e.g., a BS 110) may use a true-time-delay array architecture for frequency division multiplexing (FDM)-based beam sweeping associated with transmission of an SSB 315 rather than TDM-based beam sweeping as may occur with other techniques. When using a true-time-delay architecture, the wireless node may transmit the M repetitions of an SSB 315 in different frequency sub-bands via a true-time-delay array. For example, the wireless node may transmit different repetitions of an SSB 315 in different directions.

As indicated above, FIG. 3 is provided as an example. Other examples may differ from what is described with regard to FIG. 3.

Figure 4:
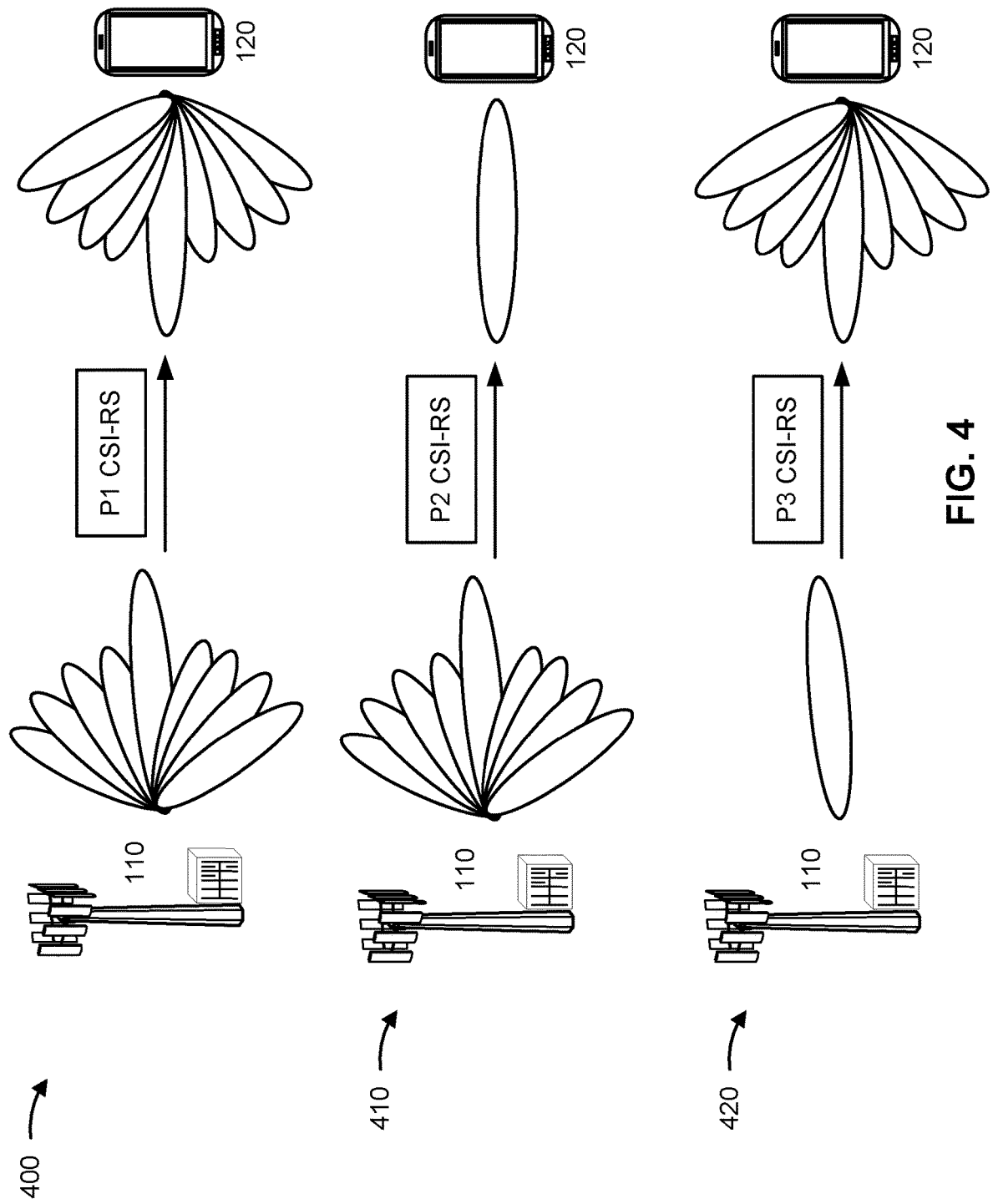
FIG. 4 is a diagram illustrating an example of channel state information-reference signal (CSI-RS) beam management procedures, in accordance with the present disclosure.

FIG. 4 is a diagram illustrating examples 400, 410, and 420 of channel state information (CSI) reference signal (RS) (CSI-RS) beam management procedures, in accordance with the present disclosure. As shown in FIG. 4, examples 400, 410, and 420 include a UE 120 in communication with a BS 110 in a wireless network (e.g., wireless network 100). However, the devices shown in FIG. 4 are provided as examples, and the wireless network may support communication and beam management between other devices (e.g., between a UE 120 and a BS 110 or transmit receive point (TRP), between a mobile termination node and a control node, between an integrated access and backhaul (IAB) child node and an IAB parent node, and/or between a scheduled node and a scheduling node). In some aspects, the UE 120 and the BS 110 may be in a connected state (e.g., an RRC connected state).

As shown in FIG. 4, example 400 may include a BS 110 and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the BS 110 to the UE 120. The CSI-RSs may be configured to be periodic (e.g., using RRC signaling), semi-persistent (e.g., using media access control (MAC) control element (MAC-CE) signaling), and/or aperiodic (e.g., using DCI).

The first beam management procedure may include the BS 110 performing beam sweeping over multiple transmit (Tx) beams. The BS 110 may transmit a CSI-RS using each transmit beam for beam management. For example, the BS 110 may transmit a CSI-RS using each direction of a true-time-delay architecture. To enable the UE 120 to perform receive (Rx) beam sweeping, the BS 110 may use a transmit beam to transmit (e.g., with repetitions) each CSI-RS at multiple times within the same RS resource set so that the UE 120 can sweep through receive beams in multiple transmission instances. For example, if the BS 110 has a set of K transmit beams and the UE 120 has a set of L receive beams, the CSI-RS may be transmitted on each of the K transmit beams L times so that the UE 120 may receive L instances of the CSI-RS per transmit beam. In other words, for each transmit beam of the BS 110, the UE 120 may perform beam sweeping through the receive beams of the UE 120. As a result, the first beam management procedure may enable the UE 120 to measure a CSI-RS on different transmit beams using different receive beams to support selection of BS 110 transmit beams/UE 120 receive beam(s) beam pair(s). The UE 120 may report the measurements to the BS 110 to enable the BS 110 to select one or more beam pair(s) for communication between the BS 110 and the UE 120. While example 400 has been described in connection with CSI-RSs, the first beam management process may also use SSBs for beam management in a similar manner as described above. For example, as described above, a BS 110 may transmit an SSB to a UE 120 to enable determination of a beam pair for communication. The BS 110 may transmit SSBs to a group of UEs 120 using a true-time-delay array to configure beam pairs with the group of UEs 120 and may receive RACH signals from the group of UEs 120 using a true-time-delay array (e.g., concurrently receiving different RACH signals from different directions and different UEs 120). In this case, an Rx direction of a received RACH may correspond to a Tx direction of a transmitted SSB. In this way, the BS 110 uses the SSB (or a CSI-RS) to configure a beam pair for communication using a true-time-delay array.

As shown in FIG. 4, example 410 may include a BS 110 and a UE 120 communicating to perform beam management using CSI-RSs. Example 410 depicts a second beam management procedure (e.g., P2 CSI-RS beam management). The second beam management procedure may be referred to as a "beam refinement procedure", a "base station beam refinement procedure", a "TRP beam refinement procedure", and/or a "transmit beam refinement procedure". As shown in FIG. 4 and example 410, CSI-RSs may be configured to be transmitted from the BS 110 to the UE 120. The CSI-RSs may be configured to be aperiodic (e.g., using downlink control information (DCI)). The second beam management procedure may include the BS 110 performing beam sweeping over one or more transmit beams. The one or more transmit beams may be a subset of all transmit beams associated with the BS 110 (e.g., determined based at least in part on measurements reported by the UE 120 in connection with the first beam management procedure). The BS 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the BS 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a "beam refinement procedure", a "UE beam refinement procedure", and/or a "receive beam refinement procedure". As shown in FIG. 4 and example 420, one or more CSI-RSs may be configured to be transmitted from the BS 110 to the UE 120. The CSI-RSs may be configured to be aperiodic (e.g., using DCI). The third beam management process may include the BS 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the BS 110 and/or the UE 120 to select a best receive beam based at least in part on reported measurements received from the UE 120 (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE 120 and the BS 110 may perform the third beam management procedure before performing the second beam management procedure, and/or the UE 120 and the BS 110 may perform a similar beam management procedure to select a UE transmit beam.

Figure 5:
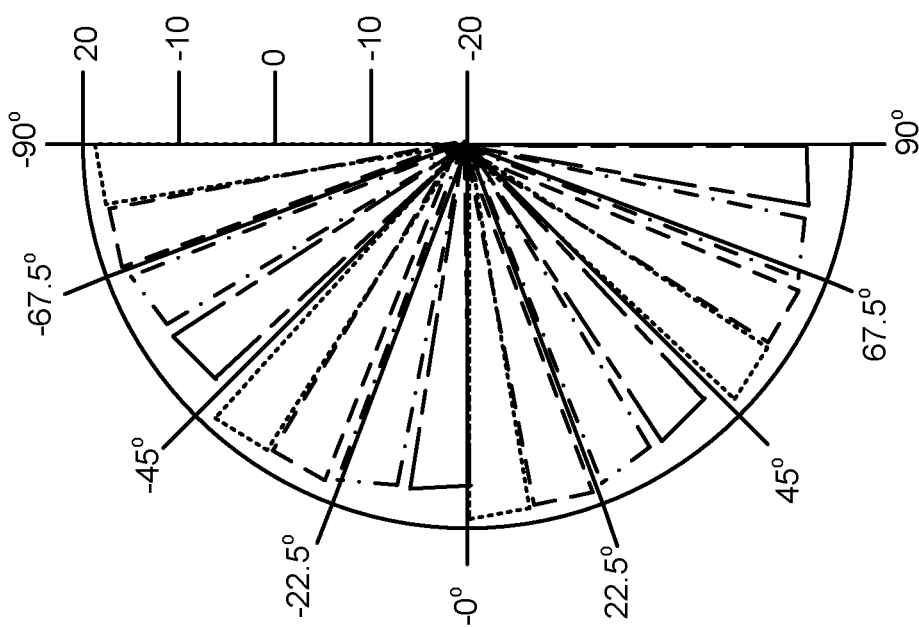
FIG. 5 is a diagram illustrating an example of true-time-delay beamforming, in accordance with the present disclosure.

FIG. 5 is a diagram illustrating an example 500 of true-time-delay beamforming, in accordance with the present disclosure.

In an analog beamforming array, a transmitter device, such as a BS 110, transmits a signal from array elements using different beamforming weights $w_i$. The transmitted signal is not frequency selective in a wireless channel, resulting in a receiver device, such as a UE 120, receiving a signal that is flat with respect to frequency (e.g., a signal transmitted using frequency-flat transmission of a true-time-delay array). However, in a true-time-delay array, which may also be referred to as a "true-time-delay analog array", a "true-time-delay architecture", or a "true-time-delay analog array architecture", among other examples, the transmitter device applies a set of different time delays, in addition to the different beamforming weights, to repetitions of the signal. For example, there may be a wideband (e.g., spanning multiple tones) signal S that is to be transmitted by an array of antenna elements, where each antenna element i multiplies signal S by its respective beamforming weight, $w_i$, as mentioned above. In this true-time-delay architecture, each antenna element i would, in addition to multiplying signal S by its respective beamforming weight, apply a time delay, $d_i$. In one mathematical representation, each antenna element i would transmit signal $Y_i$, where signal $Y_i(t)=w_i*S(t-d_i)$. A fixed time delay or time shift, $d_i$, across the antenna elements in time domain can result in a frequency dependent phase shift in the frequency domain. As such, the time delay, $d_i$, applied to each antenna element can be understood as a different frequency domain phase offset value being introduced to each tone of signal S. This phase offset can result in each tone being transmitted in a different direction. As such, when the transmitter device transmits using a true-time-delay array, the transmitter device transmits using beamforming that is frequency selective with respect to different transmit directions. While the signal S has been described above as being multiplied by beamforming weights, it is understood that such a multiplication in mathematical terms may be implemented in hardware in an antenna array, or circuitry associated with an antenna array, using different components such as phase shifters, power amplifiers, and/or the like. Further, while some implementations are described herein in terms of a transmitter device, it should be understood that a receiver device may use a similar true-time-delay architecture on a receive side to receive and process a communication.

As shown in FIG. 5, signals associated with different portions of a frequency are pointed in different directions. In other words, a transmitter device transmits a first fraction (e.g., a first sub-band) of a frequency (e.g., a frequency band) in a first direction and a second fraction (e.g., a second sub-band) of the frequency (e.g., the frequency band) in a second direction that is different than the first direction. In one example, each sub-band within the frequency band can correspond to a resource element, such that each resource element has a different frequency but is transmitted at a same time. With respect to SSB beam sweeping, a BS 110 may use the true-time-delay architecture to beam sweep SSBs using an analog beamforming architecture, but in FDM rather than TDM. For example, the BS 110 may concurrently transmit a plurality of repetitions of an SSB in different frequency sub-bands, which may correspond to the fractions of the frequency that are covered by different signals transmittable using a true-time-delay array. Similarly, the BS 110 may receive RACH signals from different directions concurrently from a plurality of UEs 120 using a true-time-delay array, which may be referred to as a "receive true-time-delay array" or an "Rx true-time-delay array", among other examples. Receipt of multiple RACH signals for different directions concurrently using a true-time-delay array may be performed, for example, in a manner that is the inverse of the method of transmitting a wideband signal S using a true-time-delay array described above. In this case, a receive direction of a RACH may correspond to a transmit direction of an SSB. In other words, the BS 110 transmits a repetition of an SSB in a particular direction to a particular UE 120 using a true-time-delay array and receives a corresponding RACH from the particular UE 120 and from the particular direction. Further, sub-bands used for transmission may correspond to sub-bands used for reception so that the BS 110 transmits the repetition of the SSB on a particular sub-band using the true-time-delay array and receives the corresponding RACH on the particular sub-band.

As indicated above, FIG. 5 is provided as an example. Other examples may differ from what is described with respect to FIG. 5.

As described above, true-time-delay beamforming may be used both for transmission of SSBs from a BS to a UE and for reception of RACHs by a BS from a UE. The BS may transmit repetitions of an SSB using a true-time-delay array and may receive corresponding RACHs using the true-time-delay array. The BS may process a received RACH based at least in part on a correspondence between a transmitted SSB and the received RACH signal. For example, a receive direction and sub-band of a RACH may correspond to a transmit direction and sub-band of an SSB. However, in some cases it may be advantageous to transmit SSBs with TDM and still receive RACHs using a true-time-delay array.

Some aspects described herein provide techniques for mapping time division multiplexed SSBs to frequency division multiplexed RACHs. For example, a BS may map a quantity S of time division multiplexed SSBs to a quantity R of frequency division multiplexed RACH occasions (ROs). In this case, the BS may use the configured mapping to determine an angular region of an RO bandwidth to sweep during an RO to successfully receive a RACH. In this way, the BS enables use of time division multiplexed SSBs with a true-time-delay array for receiving frequency division multiplexed RACHs.

Figure 6:
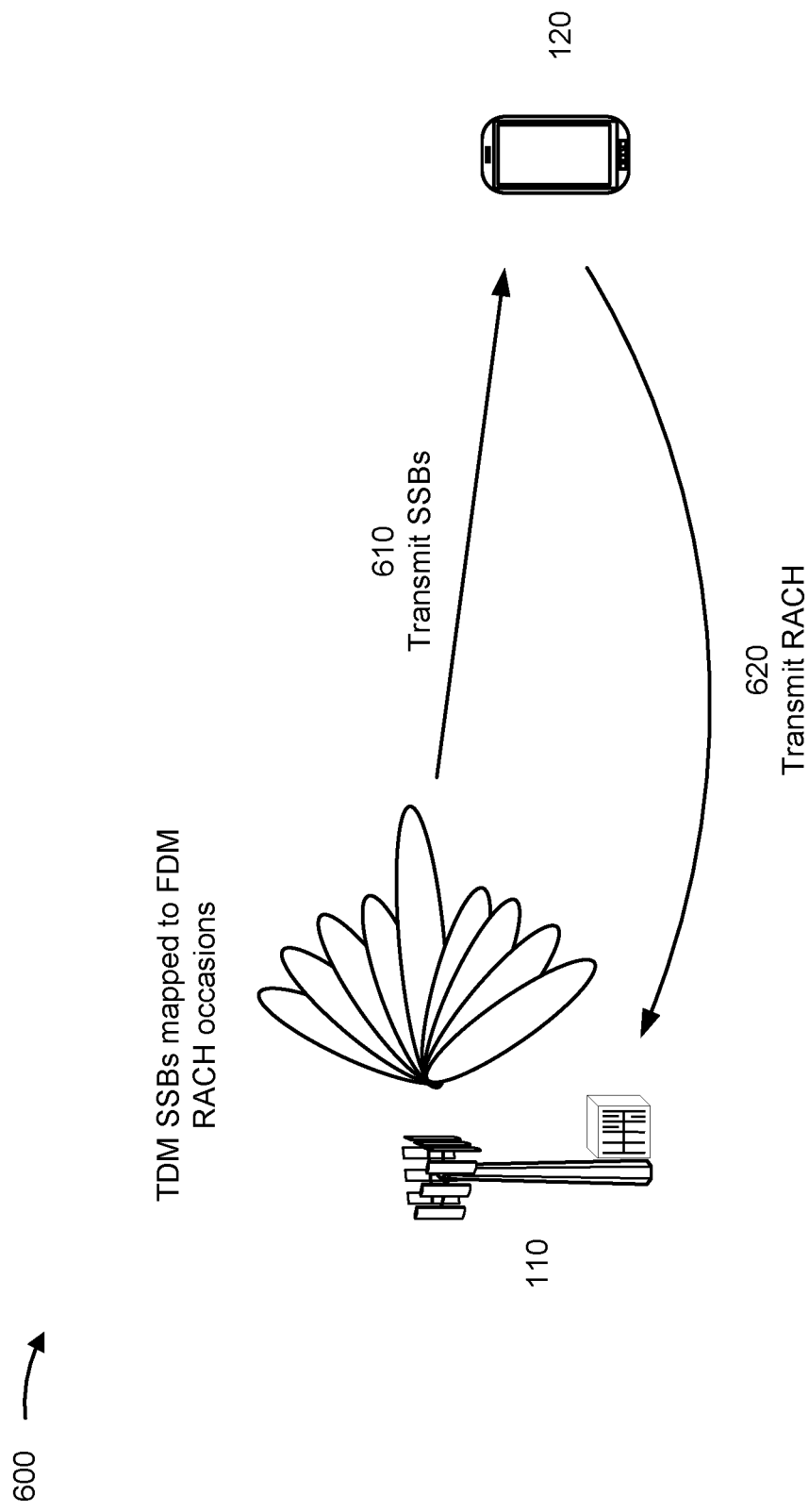
FIG. 6 is a diagram illustrating an example associated with beamforming configurations for random access channel (RACH) configuration, in accordance with the present disclosure.

FIG. 6 is a diagram illustrating an example 600 associated with beamforming configurations for RACH configuration, in accordance with the present disclosure. As shown in FIG. 6, example 600 includes communication between a BS 110 and a UE 120. In some aspects, BS 110 and UE 120 may be included in a wireless network, such as wireless network 100. BS 110 and UE 120 may communicate via a wireless access link, which may include an uplink and a downlink.

As further shown in FIG. 6, and by reference number 610, BS 110 may transmit a set of SSBs. For example, BS 110 may transmit the set of SSBs to one or more UEs 120 using time division multiplexing. In some aspects, BS 110 may transmit a plurality of SSBs across a time domain. For example, within an SS burst set, BS 110 may transmit a first SSB at a first time and a second SSB at a second time. Additionally, or alternatively, BS 110 may transmit using different analog beamforming configurations (e.g., BS 110 may transmit in different directions). For example, BS 110 may transmit a first SSB using a first analog beamforming configuration (e.g., a first spatial direction) and a second SSB using a second analog beamforming configuration (e.g., a second spatial direction).

As further shown in FIG. 6, and by reference number 620, BS 110 may receive a RACH. For example, UE 120 may transmit a RACH and BS 110 may receive the RACH using a true-time-delay array. In some aspects, BS 110 may receive a plurality of frequency division multiplexed RACHs using the true-time-delay array. In some aspects, BS 110 may use a mapping between SSBs and ROs to receive the RACH. For example, BS 110 may have a matching between S time division multiplexed SSBs and R frequency division multiplexed ROs, where S=R. In this case, BS 110 may use S analog beamforming configurations to send the SSBs in S directions (e.g., consecutive directions with respective to an azimuthal or elevation sweeping step size). Further, BS 110 may use a true-time-delay array and a mapping such that an nth RO is received in the same direction as an nth SSB is transmitted (e.g., a center resource element of the nth RO has a phase shift value across an antenna element that corresponds to a phase shift value for transmitting an nth SSB).

Additionally, or alternatively, BS 110 may map a plurality of SSBs to a single RO. For example, BS 110 may transmit S SSBs in S directions and use a true-time-delay array with a RACH configuration to sweep the same spatial coverage as the S directions within a bandwidth of a single RO. In this case, the RACH configuration may include a configuration for a long sequence format, an extended subcarrier spacing (SCS), an increased target power, or a cyclic shift, among other examples) to enable BS 110 to sweep the S directions within the bandwidth of the RO. In some aspects, a plurality of UEs 120 may transmit RACH messages (e.g., RACH message type 1 (msg1)) within the RO. For example, a first UE 120 may transmit a first msg1 as a response to a first SSB from BS 110 in an RO, and a second UE 120 may transmit a second msg1 as a response to a second SSB from BS 110 in the RO.

In this case, BS 110 may detect the plurality of UEs 120 and the corresponding msg1s based at least in part on resource block (RB) subgroups of received signals from the plurality of UEs 120. For example, BS 110 may sweep angular regions A1 and A2 (corresponding to two transmitted SSBs) in an RO and perform RACH detection on sub-signals (e.g., frequency domain received signals) corresponding to a first RO bandwidth associated with A1 and a second RO bandwidth associated with A2. In this case, based at least in part on a beam direction of BS 110 changing smoothly over a covered region and based at least in part on a RACH configuration (e.g., a RACH preamble format, a RACH signal width, a link budget, a transmit power, or a RACH target receive power, among other examples), BS 110 may acquire a finer beam or angle between A1 and A2 than may occur with other techniques for beamforming.

In some aspects, BS 110 may process one or more extra ROs in the same symbol duration as the R ROs, which are frequency division multiplexed (or partially frequency division multiplexed) with the R ROs. For example, BS 110 may transmit S SSB beams associated with an effective Rx beam or direction of the R ROs and the one or more extra ROs may have directions in between those covered by the S SSB beams. In this case, an RO with an angular region A3 may be in a gap between A1 and A2 and have a different direction than SSBs corresponding to A1 and A2. In this case, UE 120 may choose one of the R ROs or one of the extra ROs to transmit msg1 (e.g., based at least in part on measured reference signal received power (RSRP) values).

In this way, when UE 120 detects two (or more) consecutive SSBs with a threshold signal strength, UE 120 may select an RO that is associated with a direction between the two consecutive SSBs. In some aspects, the threshold signal strength is based at least in part on a configuration provided by BS 110. For example, BS 110 may indicate a first threshold signal strength for selecting one of the R ROs and a second threshold signal strength for selecting one of the extra ROs. In some aspects, BS 110 may configure a plurality of extra ROs between two consecutive ROs of the R ROs. In this case, BS 110 may configure different pairs of RSRP thresholds for selecting one of the plurality of extra ROs. In some aspects, the extra ROs are based at least in part on resource element (RE) indices (e.g., RE offsets) to provide a finer mapping between directions and ROs, thereby achieving better beam refinement and more precise angular direction detection.

As indicated above, FIG. 6 is provided as an example. Other examples may differ from what is described with respect to FIG. 6.

Figure 7:
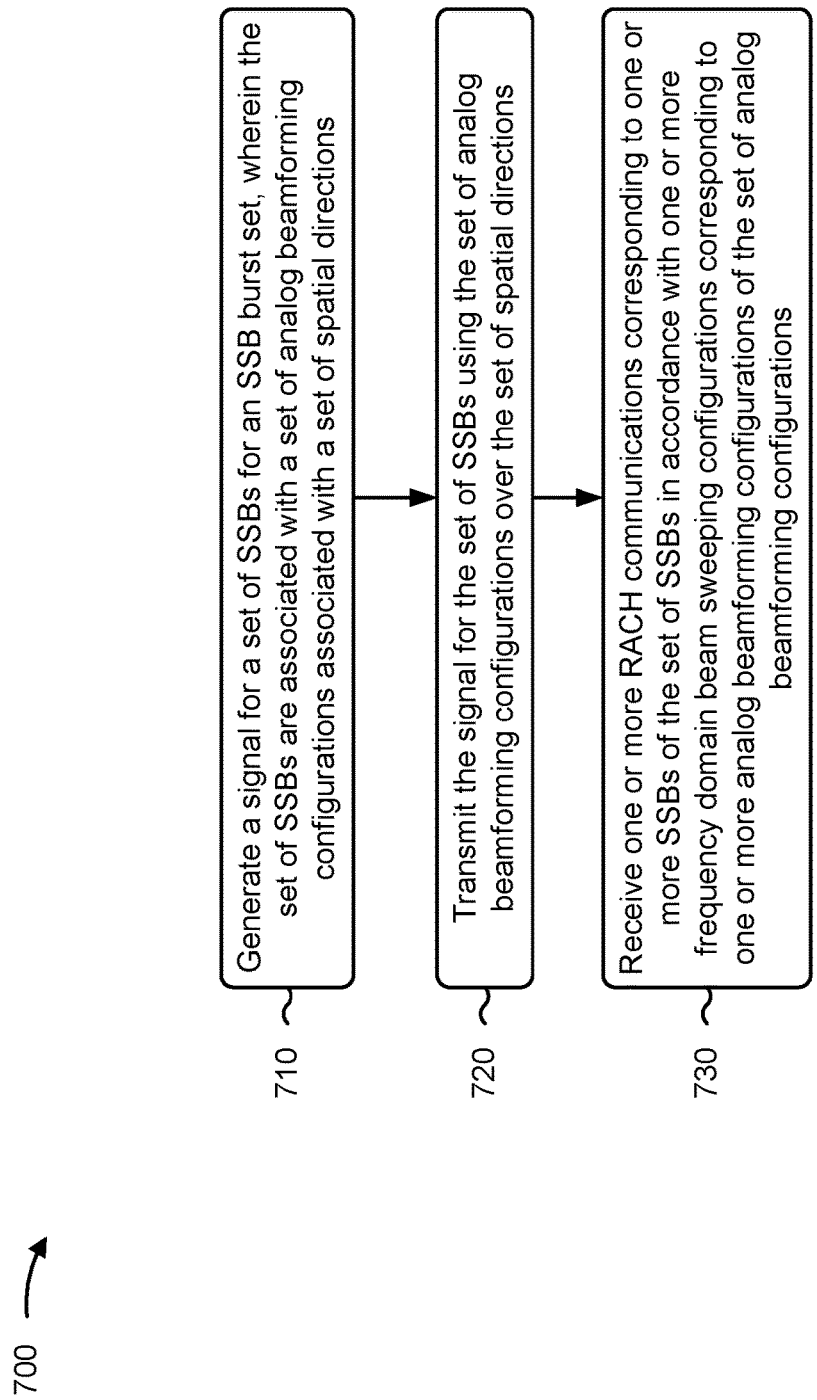
FIG. 7 is a diagram illustrating an example process associated with beamforming configurations for RACH configuration, in accordance with the present disclosure.

FIG. 7 is a diagram illustrating an example process 700 performed, for example, by a base station, in accordance with the present disclosure. Example process 700 is an example where the base station (e.g., base station 110) performs operations associated with beamforming configurations for RACH configuration.

As shown in FIG. 7, in some aspects, process 700 may include generating a signal for a set of SSBs for an SSB burst set, wherein the set of SSBs are associated with a set of analog beamforming configurations associated with a set of spatial directions (block 710). For example, the base station (e.g., using generation component 808, depicted in FIG. 8) may generate a signal for a set of SSBs for an SSB burst set, wherein the set of SSBs are associated with a set of analog beamforming configurations associated with a set of spatial directions, as described above, for example, with reference to FIG. 6.

As further shown in FIG. 7, in some aspects, process 700 may include transmitting the signal for the set of SSBs using the set of analog beamforming configurations over the set of spatial directions (block 720). For example, the base station (e.g., using transmission component 804, depicted in FIG. 8) may transmit the signal for the set of SSBs using the set of analog beamforming configurations over the set of spatial directions, as described above, for example, with reference to FIG. 6.

As further shown in FIG. 7, in some aspects, process 700 may include receiving one or more RACH communications corresponding to one or more SSBs of the set of SSBs in accordance with one or more frequency domain beam sweeping configurations corresponding to one or more analog beamforming configurations of the set of analog beamforming configurations (block 730). For example, the base station (e.g., using reception component 802, depicted in FIG. 8) may receive one or more RACH communications corresponding to one or more SSBs of the set of SSBs in accordance with one or more frequency domain beam sweeping configurations corresponding to one or more analog beamforming configurations of the set of analog beamforming configurations, as described above, for example, with reference to FIG. 6.

Process 700 may include additional aspects, such as any single aspect or any combination of aspects described below and/or in connection with one or more other processes described elsewhere herein.

In a first aspect, the set of SSBs are time-division multiplexed (TDM) and the one or more RACH communications are frequency-division multiplexed (FDM) in accordance with a TDM-to-FDM mapping.

In a second aspect, alone or in combination with the first aspect, the set of spatial directions is a set of consecutive spatial directions with regard to an azimuthal or elevation sweep step size.

In a third aspect, alone or in combination with one or more of the first and second aspects, an SSB, of the set of SSBs, and a RACH communication, of the one or more RACH communications, are associated with a common phase shift value.

In a fourth aspect, alone or in combination with one or more of the first through third aspects, the set of SSBs are TDM and map to a single RACH occasion associated with the one or more RACH communications.

In a fifth aspect, alone or in combination with one or more of the first through fourth aspects, the base station is configured with a RACH configuration that includes at least one of a long sequence format parameter, a subcarrier spacing parameter, a target power parameter, or a cyclic shift parameter.

In a sixth aspect, alone or in combination with one or more of the first through fifth aspects, receiving the one or more RACH communications comprises processing one or more resource block subgroups of a received signal in a RACH occasion during which there are transmissions by a plurality of UEs, and identifying a RACH communication, of the one or more RACH communications, associated with a particular UE, of the plurality of UEs, based at least in part on processing the one or more resource block subgroups of the received signal in the RACH occasion.

In a seventh aspect, alone or in combination with one or more of the first through sixth aspects, receiving the one or more RACH communications comprises sweeping an angular region defined by a set of configured angular directions and a delta value, and performing RACH processing at a set of locations within the angular region to acquire a beam or spatial direction associated with receiving a RACH communication of the one or more RACH communications.

In an eighth aspect, alone or in combination with one or more of the first through seventh aspects, the first one or more RACH occasions are at one or more spatial directions between the set of spatial directions associated with the second one or more RACH communications.

In a ninth aspect, alone or in combination with one or more of the first through eighth aspects, process 700 includes receiving at least one RACH communication in at least one RACH occasion of the one or more RACH occasions, wherein the at least one RACH occasion is selected based at least in part on a detected SSB or a measured reference signal received power value.

In a tenth aspect, alone or in combination with one or more of the first through ninth aspects, process 700 includes transmitting information to indicate a threshold reference signal received power value for selecting the at least one RACH occasion.

In an eleventh aspect, alone or in combination with one or more of the first through tenth aspects, the at least one RACH occasion is selected based at least in part on a plurality of reference signal received powers of a plurality of detected SSBs.

In a twelfth aspect, alone or in combination with one or more of the first through eleventh aspects, a plurality of RACH occasions of the first one or more RACH occasions are at spatial directions between spatial directions of two consecutive RACH occasions of the second one or more RACH occasions.

In a thirteenth aspect, alone or in combination with one or more of the first through twelfth aspects, the at least one RACH occasion is selected from the plurality of RACH occasions based at least in part on a pair of reference signal received power thresholds.

In a fourteenth aspect, alone or in combination with one or more of the first through thirteenth aspects, process 700 includes sweeping a particular spatial coverage region for a bandwidth of a RACH occasion associated with the one or more RACH communications and for the set of SSBs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
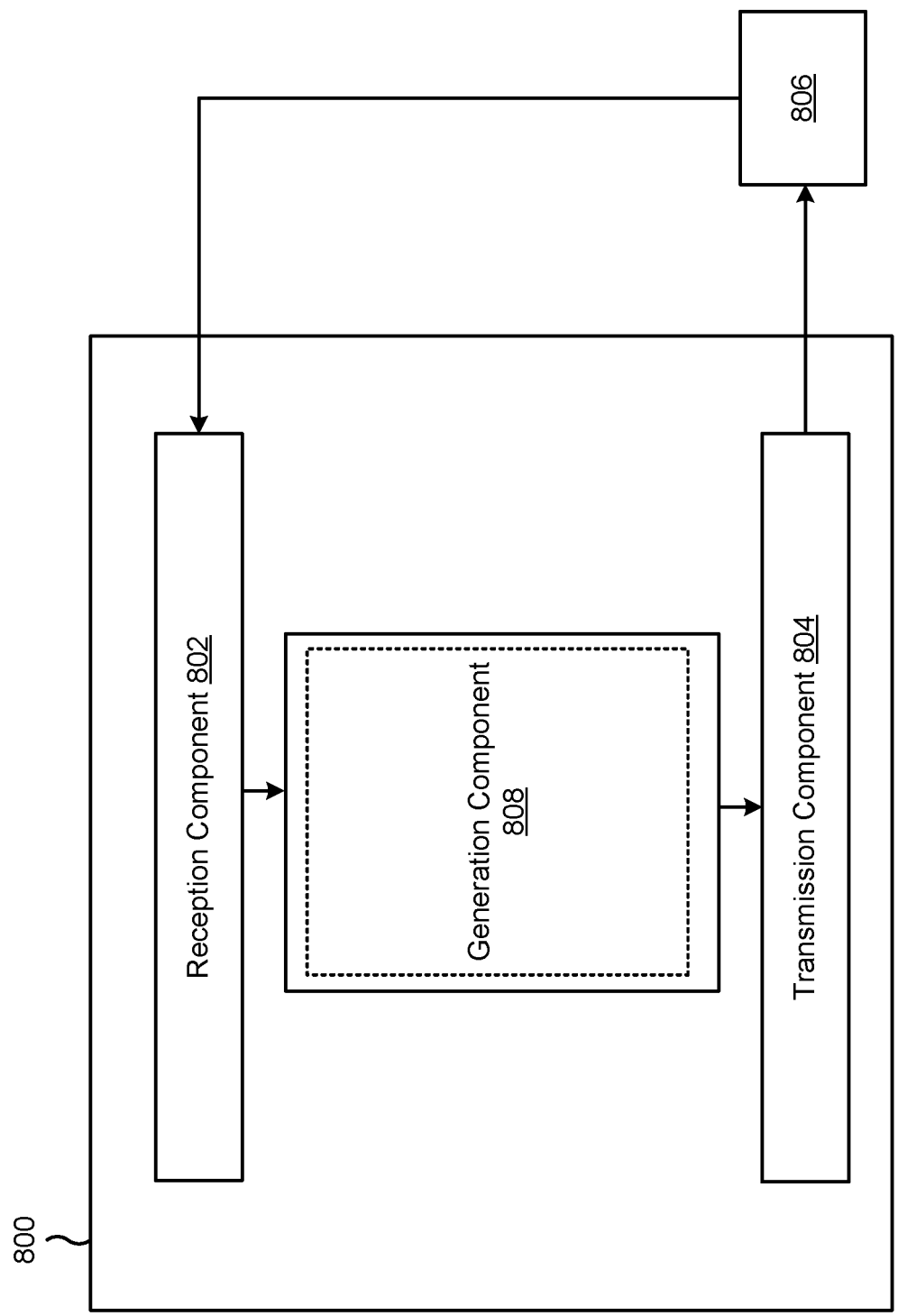
FIG. 8 is a block diagram of an example apparatus for wireless communication, in accordance with the present disclosure.

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a generation component 808, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7 or a combination thereof. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples) and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be co-located with the reception component 802 in a transceiver.

The generation component 808 may generate a signal for a set of SSBs for an SSB burst set, wherein the set of SSBs are associated with a set of analog beamforming configurations associated with a set of spatial directions. The transmission component 804 may transmit the signal for the set of SSBs using the set of analog beamforming configurations over the set of spatial directions. The reception component 802 may receive one or more RACH communications corresponding to one or more SSBs of the set of SSBs in accordance with one or more frequency domain beam sweeping configurations corresponding to one or more analog beamforming configurations of the set of analog beamforming configurations.

The reception component 802 may receive at least one RACH communication in at least one RACH occasion of the one or more RACH occasions wherein the at least one RACH occasion is selected based at least in part on a detected SSB or a measured reference signal received power value. The transmission component 804 may transmit information to indicate a threshold reference signal received power value for selecting the at least one RACH occasion.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
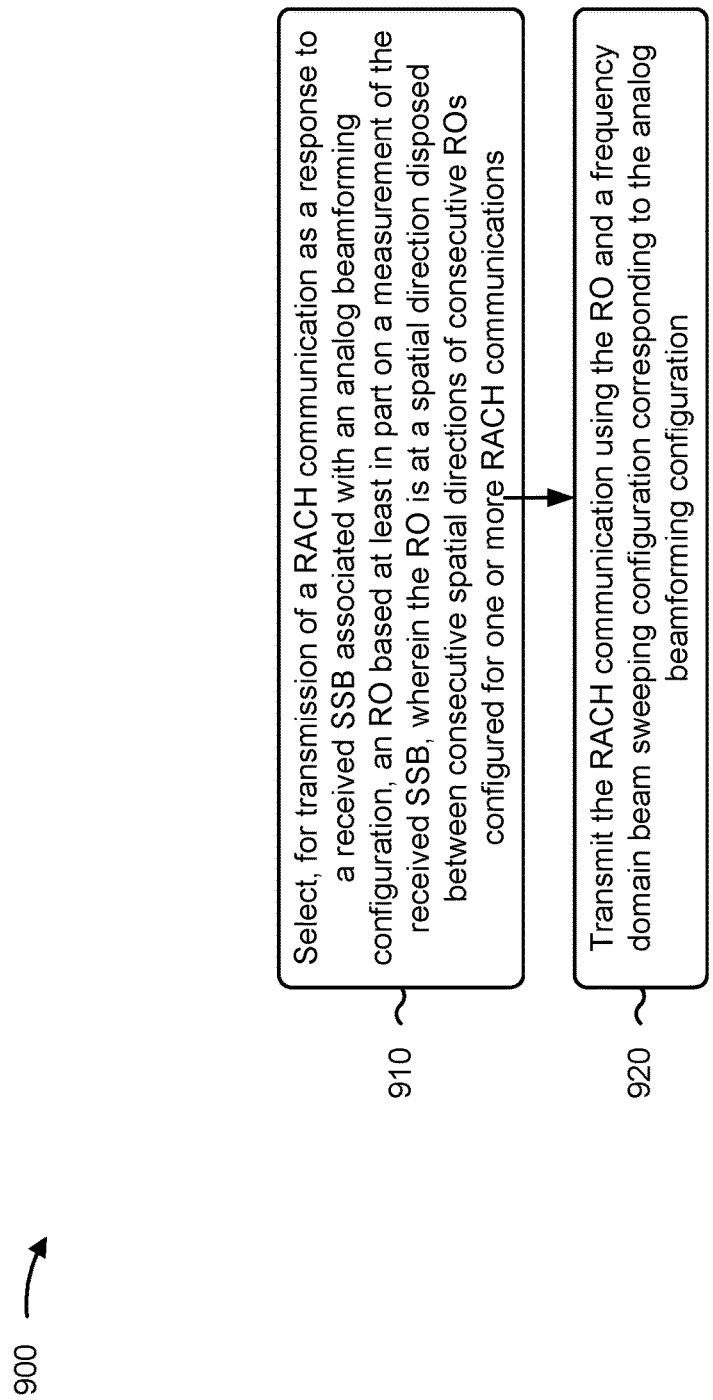
FIG. 9 is a diagram illustrating an example process associated with beamforming configurations for RACH configuration, in accordance with the present disclosure.

FIG. 9 is a diagram illustrating an example process 900 performed, for example, by a UE, in accordance with the present disclosure. Example process 900 is an example where the UE (e.g., UE 120) performs operations associated with beamforming configurations for random access.

As shown in FIG. 9, in some aspects, process 900 may include selecting, for transmission of a RACH communication as a response to a received SSB associated with an analog beamforming configuration, an RO based at least in part on a measurement of the received SSB, wherein the RO is at a spatial direction disposed between consecutive spatial directions of consecutive ROs configured for one or more RACH communications (block 910). For example, the UE (e.g., using selection component 1008, depicted in FIG. 10) may select, for transmission of a RACH communication as a response to a received SSB associated with an analog beamforming configuration, an RO based at least in part on a measurement of the received SSB, wherein the RO is at a spatial direction disposed between consecutive spatial directions of consecutive ROs configured for one or more RACH communications, as described above, for example, with reference to FIG. 6.

As further shown in FIG. 9, in some aspects, process 900 may include transmitting the RACH communication using the RO and a frequency domain beam sweeping configuration corresponding to the analog beamforming configuration (block 920). For example, the UE (e.g., using transmission component 1004, depicted in FIG. 10) may transmit the RACH communication using the RO and a frequency domain beam sweeping configuration corresponding to the analog beamforming configuration, as described above, for example, with reference to FIG. 6.

Process 900 may include additional aspects, such as any single aspect or any combination of aspects described below and/or in connection with one or more other processes described elsewhere herein.

In a first aspect, the received SSB is time-division multiplexed (TDM) with one or more other SSBs and the RACH communication is frequency-division multiplexed (FDM) with one or more other RACH communications in accordance with a TDM-to-FDM mapping.

In a second aspect, the received SSB is received in a spatial direction of a set of consecutive spatial directions with regard to an azimuthal or elevation sweep step size.

In a third aspect, the received SSB and the RACH communication are associated with a common phase shift value.

In a fourth aspect, SSBs, of a set of SSBs that includes the received SSB, are time-division multiplexed (TDM) and map to a single RACH occasion associated with the RACH communication.

In a fifth aspect, the RACH communication is associated with a RACH configuration that includes at least one of a long sequence format parameter, a subcarrier spacing parameter, a target power parameter, or a cyclic shift parameter.

In a sixth aspect, process 900 includes transmitting the RACH communication in a resource block subgroups in the RO.

In a seventh aspect, process 900 includes transmitting the RACH communication in an angular region defined by a set of configured angular directions.

In an eighth aspect, the RO is at a spatial direction disposed between consecutive spatial directions of consecutive ROs configured for one or more RACH communications.

In a ninth aspect, process 900 includes measuring a set of SSBs associated with the consecutive ROs, selecting the RO between the consecutive ROs based at least in part on measurements of the set of SSBs satisfying a threshold.

In a tenth aspect, the threshold is a plurality of reference signal received power (RSRP) thresholds corresponding to a plurality of measurements of the set of SSBs.

In an eleventh aspect, the RO is associated with a resource element (RE) that is between or overlapping with one or more REs for one or more ROs associated with the consecutive ROs.

In a twelfth aspect, the RO is one of a plurality of ROs disposed between the consecutive ROs and wherein a first threshold is associated with selection of a first RO of the plurality of ROs and a second threshold is associated with selection of a second RO of the plurality of ROs.

In a thirteenth aspect, process 900 includes receiving information to indicate a threshold reference signal received power value for selecting the RO.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
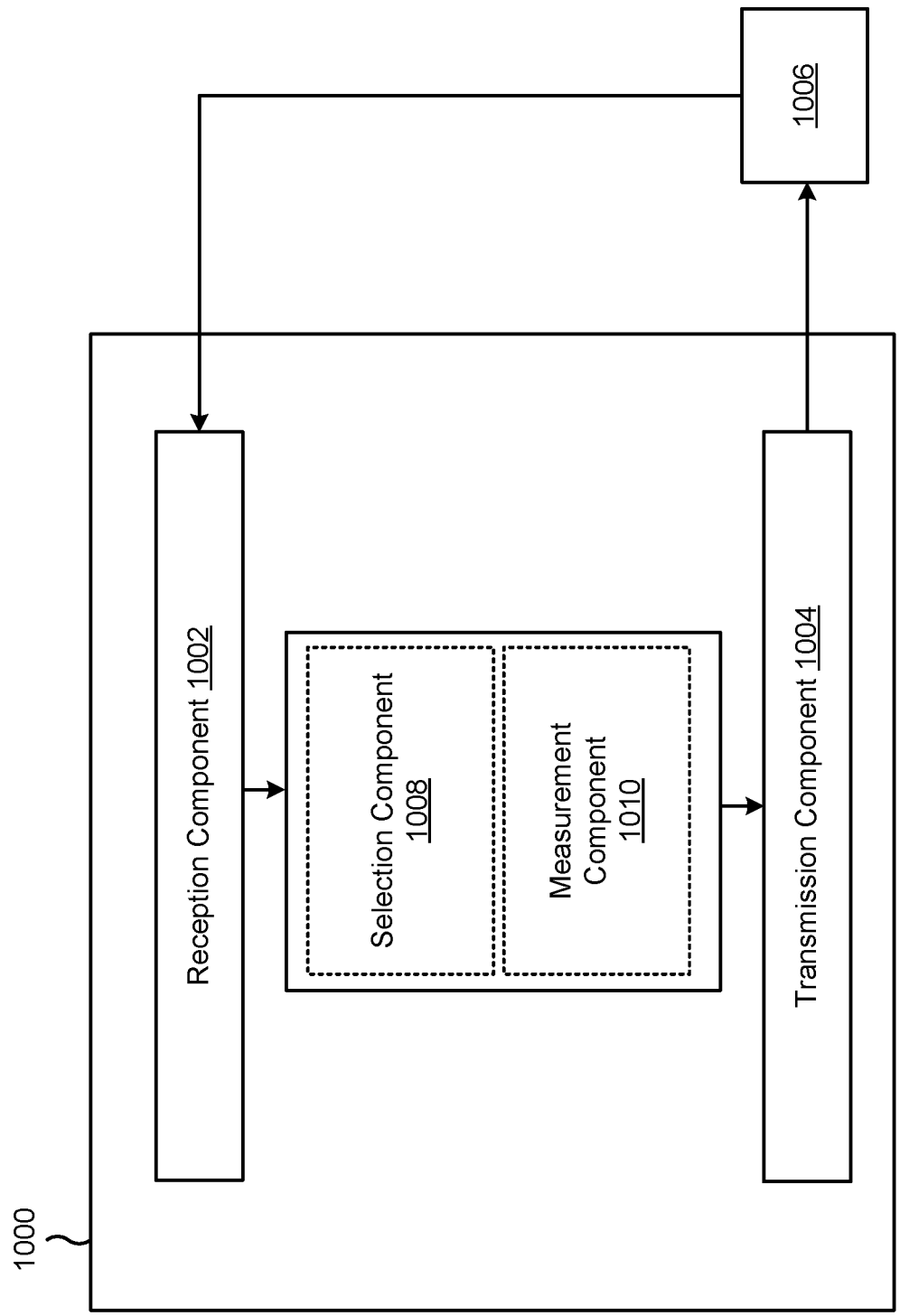
FIG. 10 is a block diagram of an example apparatus for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a selection component 1008 or a measurement component 1010, among other examples.

In some aspects, the apparatus 1000 may be configured to perform one or more operations described herein in connection with FIG. 6. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The selection component 1008 may select, for transmission of a random access channel (RACH) communication as a response to a received synchronization signal block (SSB) associated with an analog beamforming configuration, a RACH occasion (RO) based at least in part on a measurement of the received SSB, wherein the RO is at a spatial direction disposed between consecutive spatial directions of consecutive ROs configured for one or more RACH communications. The transmission component 1004 may transmit the RACH communication using the RO and a frequency domain beam sweeping configuration corresponding to the analog beamforming configuration. The transmission component 1004 may transmit the RACH communication in a resource block subgroups in the RO. The transmission component 1004 may transmit the RACH communication in an angular region defined by a set of configured angular directions. The measurement component 1010 may measure a set of SSBs associated with the consecutive ROs. The selection component 1008 may select the RO between the consecutive ROs based at least in part on measurements of the set of SSBs satisfying a threshold. The reception component 1002 may receive information to indicate a threshold reference signal received power value for selecting the RO.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a base station, comprising: generating a signal for a set of synchronization signal blocks (SSBs) for an SSB burst set, wherein the set of SSBs are associated with a set of analog beamforming configurations associated with a set of spatial directions; transmitting the signal for the set of SSBs using the set of analog beamforming configurations over the set of spatial directions; and receiving one or more random access channel (RACH) communications corresponding to one or more SSBs of the set of SSBs in accordance with one or more frequency domain beam sweeping configurations corresponding to one or more analog beamforming configurations of the set of analog beamforming configurations.

Aspect 2: The method of Aspect 1, wherein the set of SSBs are time-division multiplexed (TDM) and the one or more RACH communications are frequency-division multiplexed (FDM) in accordance with a TDM-to-FDM mapping.

Aspect 3: The method of any of Aspects 1 to 2, wherein the set of spatial directions is a set of consecutive spatial directions with regard to an azimuthal or elevation sweep step size.

Aspect 4: The method of any of Aspects 1 to 3, wherein an SSB, of the set of SSBs, and a RACH communication, of the one or more RACH communications, are associated with a common phase shift value.

Aspect 5: The method of any of Aspects 1 to 4, wherein the set of SSBs are time-division multiplexed (TDM) and map to a single RACH occasion associated with the one or more RACH communications.

Aspect 6: The method of any of Aspects 1 to 2, wherein the base station is configured to sweep a particular spatial coverage region for a bandwidth of a RACH occasion associated with the one or more RACH communications and for the set of SSBs.

Aspect 7: The method of Aspect 6, wherein the base station is configured with a RACH configuration that includes at least one of: a long sequence format parameter, a subcarrier spacing parameter, a target power parameter, or a cyclic shift parameter.

Aspect 8: The method of any of Aspects 1 to 7, wherein receiving the one or more RACH communications comprises: processing one or more resource block subgroups of a received signal in a RACH occasion during which there are transmissions by a plurality of user equipment (UEs); and identifying a RACH communication, of the one or more RACH communications, associated with a particular UE, of the plurality of UEs, based at least in part on processing the one or more resource block subgroups of the received signal in the RACH occasion.

Aspect 9: The method of any of Aspects 1 to 8, wherein receiving the one or more RACH communications comprises: sweeping an angular region defined by a set of configured angular directions and a delta value; and performing RACH processing at a set of locations within the angular region to acquire a beam or spatial direction associated with receiving a RACH communication of the one or more RACH communications.

Aspect 10: The method of any of Aspects 1 to 9, wherein the base station is configured to monitor a first one or more RACH occasions frequency-division multiplexed with a second one or more RACH occasions associated with the one or more RACH communications, wherein the first one or more RACH occasions are at one or more spatial directions between the set of spatial directions associated with the second one or more RACH communications.

Aspect 11: The method of Aspect 10, further comprising: receiving at least one RACH communication in at least one RACH occasion of the one or more RACH occasions, wherein the at least one RACH occasion is selected based at least in part on a detected SSB or a measured reference signal received power value.

Aspect 12: The method of Aspect 11, further comprising: transmitting information to indicate a threshold reference signal received power value for selecting the at least one RACH occasion.

Aspect 13: The method of any of Aspects 11 to 12, wherein the at least one RACH occasion is selected based at least in part on a plurality of reference signal received powers of a plurality of detected SSBs.

Aspect 14: The method of any of Aspects 1 to 13, wherein a plurality of RACH occasions of the first one or more RACH occasions are at spatial directions between two consecutive RACH occasions of the second one or more RACH occasions.

Aspect 15: The method of any of Aspects 1 to 14, wherein the at least one RACH occasion is selected from the plurality of RACH occasions based at least in part on a pair of reference signal received power thresholds.

Aspect 16: A method of wireless communication performed by a user equipment (UE), comprising: selecting, for transmission of a random access channel (RACH) communication as a response to a received synchronization signal block (SSB) associated with an analog beamforming configuration, a RACH occasion (RO) based at least in part on a measurement of the received SSB, wherein the RO is at a spatial direction disposed between consecutive spatial directions of consecutive ROs configured for one or more RACH communications; transmitting the RACH communication using the RO and a frequency domain beam sweeping configuration corresponding to the analog beamforming configuration.

Aspect 17: The method of Aspect 16, wherein the received SSB is time-division multiplexed (TDM) with one or more other SSBs and the RACH communication is frequency-division multiplexed (FDM) with one or more other RACH communications in accordance with a TDM-to-FDM mapping.

Aspect 18: The method of any of Aspects 16 to 17, wherein the received SSB is received in a spatial direction of a set of consecutive spatial directions with regard to an azimuthal or elevation sweep step size.

Aspect 19: The method of any of Aspects 16 to 18, wherein the received SSB and the RACH communication are associated with a common phase shift value.

Aspect 20: The method of any of Aspects 16 to 19, wherein SSBs, of a set of SSBs that includes the received SSB, are time-division multiplexed (TDM) and map to a single RACH occasion associated with the RACH communication.

Aspect 21: The method of any of Aspects 16 to 20, wherein the RACH communication is associated with a RACH configuration that includes at least one of: a long sequence format parameter, a subcarrier spacing parameter, a target power parameter, or a cyclic shift parameter.

Aspect 22: The method of any of Aspects 16 to 21, comprising: transmitting the RACH communication in a resource block subgroups in the RO.

Aspect 23: The method of any of Aspects 16 to 22, comprising: transmitting the RACH communication in an angular region defined by a set of configured angular directions.

Aspect 24: The method of any of Aspects 16 to 23, wherein the RO is at a spatial direction disposed between consecutive spatial directions of consecutive ROs configured for one or more RACH communications.

Aspect 25: The method of any of Aspects 16 to 24, further comprising: measuring a set of SSBs associated with the consecutive ROs; selecting the RO between the consecutive ROs based at least in part on measurements of the set of SSBs satisfying a threshold.

Aspect 26: The method of Aspect 25, wherein the threshold is a plurality of reference signal received power (RSRP) thresholds corresponding to a plurality of measurements of the set of SSBs.

Aspect 27: The method of any of Aspects 25 to 26, wherein the RO is associated with a resource element (RE) that is between or overlapping with one or more REs for one or more ROs associated with the consecutive ROs.

Aspect 28: The method of any of Aspects 25 to 27, wherein the RO is one of a plurality of ROs disposed between the consecutive ROs and wherein a first threshold is associated with selection of a first RO of the plurality of ROs and a second threshold is associated with selection of a second RO of the plurality of ROs.

Aspect 28: The method of any of Aspects 25 to 28, further comprising: receiving information to indicate a threshold reference signal received power value for selecting the RO.

Aspect 29: An apparatus for wireless communication at a device, comprising a processor; memory coupled with the processor; and instructions stored in the memory and executable by the processor to cause the apparatus to perform the method of one or more Aspects of Aspects 1-15.

Aspect 30: A device for wireless communication, comprising a memory and one or more processors coupled to the memory, the memory and the one or more processors configured to perform the method of one or more Aspects of Aspects 1-15.

Aspect 31: An apparatus for wireless communication, comprising at least one means for performing the method of one or more Aspects of Aspects 1-15.

Aspect 32: A non-transitory computer-readable medium storing code for wireless communication, the code comprising instructions executable by a processor to perform the method of one or more Aspects of Aspects 1-15.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-15.

Aspect 34: An apparatus for wireless communication at a device, comprising a processor; memory coupled with the processor; and instructions stored in the memory and executable by the processor to cause the apparatus to perform the method of one or more Aspects of Aspects 16-28.

Aspect 35: A device for wireless communication, comprising a memory and one or more processors coupled to the memory, the memory and the one or more processors configured to perform the method of one or more Aspects of Aspects 16-28.

Aspect 36: An apparatus for wireless communication, comprising at least one means for performing the method of one or more Aspects of Aspects 16-28.

Aspect 37: A non-transitory computer-readable medium storing code for wireless communication, the code comprising instructions executable by a processor to perform the method of one or more Aspects of Aspects 16-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 16-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station for wireless communication, comprising:
   a memory;
   a transceiver; and
   one or more processors, coupled to the memory and the transceiver, configured to:
      generate a signal for a set of synchronization signal blocks (SSBs) for an SSB burst set, wherein the set of SSBs are associated with a set of analog beamforming configurations associated with a set of spatial directions;
      transmit, via the transceiver, the signal for the set of SSBs using the set of analog beamforming configurations over the set of spatial directions; and
      receive, via the transceiver and using a true-time-delay architecture to use a set of frequency domain beam sweeping configurations corresponding to the set of analog beamforming configurations, a plurality of random access channel (RACH) communications from a plurality of spatial directions, the plurality of RACH communications corresponding to a plurality of SSBs of the set of SSBs.

2. The base station of claim 1, wherein the set of SSBs are time-division multiplexed (TDM) and the plurality of RACH communications are frequency-division multiplexed (FDM) in accordance with a TDM-to-FDM mapping.

3. The base station of claim 1, wherein the set of spatial directions is a set of consecutive spatial directions with regard to an azimuthal or elevation sweep step size.

4. The base station of claim 1, wherein an SSB, of the set of SSBs, and a RACH communication, of the plurality of RACH communications, are associated with a common phase shift value.

5. The base station of claim 1, wherein the set of SSBs are time-division multiplexed (TDM) and map to a single RACH occasion associated with the plurality of RACH communications.

6. The base station of claim 1, wherein the base station is configured to sweep a particular spatial coverage region for a bandwidth of a RACH occasion associated with the plurality of RACH communications and for the set of SSBs.

7. The base station of claim 6, wherein the base station is configured with a RACH configuration that includes at least one of:
   a long sequence format parameter,
   a subcarrier spacing parameter,
   a target power parameter, or
   a cyclic shift parameter.

8. The base station of claim 1, wherein the one or more processors, to receive the plurality of RACH communications, are configured to:

process one or more resource block subgroups of a received signal in a RACH occasion during which there are transmissions by a plurality of user equipment (UEs); and identify a RACH communication, of the plurality of RACH communications, associated with a particular UE, of the plurality of UEs, based at least in part on processing the one or more resource block subgroups of the received signal in the RACH occasion.

9. The base station of claim 1, wherein the one or more processors, to receive the plurality of RACH communications, are configured to:

sweep an angular region defined by a set of configured angular directions; and perform RACH processing at a set of locations within the angular region to acquire a beam or spatial direction associated with receiving a RACH communication of the plurality of RACH communications.

10. The base station of claim 1, wherein the base station is configured to monitor a first one or more RACH occasions frequency-division multiplexed with a second one or more RACH occasions associated with the plurality of RACH communications, wherein the first one or more RACH occasions are at one or more spatial directions between the set of spatial directions associated with the second one or more RACH occasions.

11. The base station of claim 10, wherein the one or more processors are further configured to:

receive, via the transceiver, at least one RACH communication in at least one RACH occasion of the one or more RACH occasions, wherein the at least one RACH occasion is selected based at least in part on a detected SSB or a measured reference signal received power value.

12. The base station of claim 11, wherein the one or more processors are further configured to:

transmit, via the transceiver, information to indicate a threshold reference signal received power value for selecting the at least one RACH occasion.

13. The base station of claim 11, wherein the at least one RACH occasion is selected based at least in part on a plurality of reference signal received powers of a plurality of detected SSB s.

14. The base station of claim 11, wherein a plurality of RACH occasions of the first one or more RACH occasions are at spatial directions between two consecutive RACH occasions of the second one or more RACH occasions.

15. A user equipment (UE) for wireless communication, comprising:

a memory;

a transceiver; and one or more processors, coupled to the memory and the transceiver, configured to:

select, for transmission of a random access channel (RACH) communication as a response to a received synchronization signal block (SSB) associated with true-time-delay beamforming and an analog beamforming configuration, a RACH occasion (RO) based at least in part on a measurement of the received SSB, wherein the RO is at a spatial direction disposed between consecutive spatial directions of consecutive ROs configured for a plurality of RACH communications; and transmit, via the transceiver, the RACH communication using the RO and a frequency domain beam sweeping configuration corresponding to the analog beamforming configuration.

16. The UE of claim 15, wherein the received SSB is time-division multiplexed (TDM) with one or more other SSBs and the RACH communication is frequency-division multiplexed (FDM) with one or more other RACH communications in accordance with a TDM-to-FDM mapping.

17. The UE of claim 15, wherein the received SSB is received in a spatial direction of a set of consecutive spatial directions with regard to an azimuthal or elevation sweep step size.

18. The UE of claim 15, wherein the received SSB and the RACH communication are associated with a common phase shift value.

19. The UE of claim 15, wherein SSBs, of a set of SSBs that includes the received SSB, are time-division multiplexed (TDM) and map to a single RACH occasion associated with the RACH communication.

20. The UE of claim 15, wherein the RACH communication is associated with a RACH configuration that includes at least one of:

a long sequence format parameter, a subcarrier spacing parameter, a target power parameter, or a cyclic shift parameter.

21. The UE of claim 15, wherein the one or more processors, to transmit the RACH communication, arc configured to:

transmit the RACH communication in a resource block subgroups in the RO.

22. The UE of claim 15, wherein the one or more processors, to transmit the RACH communication, are configured to:

transmit the RACH communication in an angular region defined by a set of configured angular directions.

23. The UE of claim 15, wherein the one or more processors are further configured to:

measure a set of SSBs associated with the consecutive ROs; and select the RO between the consecutive ROs based at least in part on measurements of the set of SSBs satisfying a threshold.

24. The UE of claim 23, wherein the threshold is a plurality of reference signal received power (RSRP) thresholds corresponding to a plurality of measurements of the set of SSBs.

25. The UE of claim 15, wherein the RO is associated with a resource element (RE) that is between or overlapping with one or more REs for one or more ROs associated with the consecutive ROs.

26. The UE of claim 15, wherein the RO is one of a plurality of ROs disposed between the consecutive ROs and wherein a first threshold is associated with selection of a first RO of the plurality of ROs and a second threshold is associated with selection of a second RO of the plurality of ROs.

27. The UE of claim 26, wherein the one or more processors are further configured to:

receive, via the transceiver, information to indicate a threshold reference signal received power value for selecting the RO.

28. The UE of claim 26, wherein the RO is selected based at least in part on a plurality of reference signal received powers of a plurality of detected SSBs.

29. A method of wireless communication performed by a base station, comprising:
- generating a signal for a set of synchronization signal blocks (SSBs) for an SSB burst set, wherein the set of SSBs are associated with a set of analog beamforming configurations associated with a set of spatial directions;
- transmitting the signal for the set of SSBs using the set of analog beamforming configurations over the set of spatial directions; and
- receiving, using a true-time-delay architecture to use a set of frequency domain beam sweeping configurations corresponding to the set of analog beamforming configurations, a plurality of random access channel (RACH) communications from a plurality of spatial directions, the plurality of RACH communications corresponding to a plurality of SSBs of the set of SSBs.

30. A method of wireless communication performed by a user equipment (UE), comprising:
- selecting, for transmission of a random access channel (RACH) communication as a response to a received synchronization signal block (SSB) associated with true-time-delay beamforming and an analog beamforming configuration, a RACH occasion (RO) based at least in part on a measurement of the received SSB, wherein the RO is at a spatial direction disposed between consecutive spatial directions of consecutive ROs configured for a plurality of RACH communications; and
- transmitting the RACH communication using the RO and a frequency domain beam sweeping configuration corresponding to the analog beamforming configuration.

* * * * *